United States Patent
Mann et al.

(10) Patent No.: US 8,425,671 B2
(45) Date of Patent: Apr. 23, 2013

(54) SYSTEMS, METHODS, AND APPARATUS FOR PROVIDING FILTRATION

(75) Inventors: Richard Mann, Hampshire (GB);
Abhijeet Kulkarni, Hampshire (GB);
Peter McGuigan, Hampshire (GB)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 13/180,783

(22) Filed: Jul. 12, 2011

(65) Prior Publication Data

US 2013/0014478 A1    Jan. 17, 2013

(51) Int. Cl.
*B01D 46/00* (2006.01)

(52) U.S. Cl.
USPC .............. 95/273; 55/378; 55/379; 55/493; 55/508

(58) Field of Classification Search ........... 55/361–382, 55/282–305, 490–519; 95/273; 28/428
See application file for complete search history.

(56) References Cited

U.S. PATENT DOCUMENTS

| | | | | |
|---|---|---|---|---|
| 4,235,610 A | * | 11/1980 | Richard | 55/302 |
| 5,173,098 A | * | 12/1992 | Pipkorn | 55/379 |
| 5,223,134 A | * | 6/1993 | Riva | 210/232 |
| 5,895,510 A | * | 4/1999 | Butler et al. | 55/490 |
| 5,954,849 A | * | 9/1999 | Berkhoel et al. | 55/498 |
| 6,203,591 B1 | * | 3/2001 | Clements et al. | 55/341.1 |
| 6,364,921 B1 | * | 4/2002 | Raether et al. | 55/302 |
| 6,875,256 B2 | * | 4/2005 | Gillingham et al. | 95/273 |
| 7,374,796 B2 | * | 5/2008 | Smithies | 427/365 |
| 7,632,325 B2 | * | 12/2009 | Welch et al. | 55/341.1 |
| 7,905,935 B2 | * | 3/2011 | Clements | 55/341.1 |
| 8,070,848 B2 | * | 12/2011 | Cosgrove | 55/502 |
| 2004/0103626 A1 | * | 6/2004 | Warth et al. | 55/467 |
| 2005/0034436 A1 | * | 2/2005 | Pipkorn et al. | 55/379 |
| 2009/0107337 A1 | * | 4/2009 | Vu | 95/279 |
| 2010/0326024 A1 | * | 12/2010 | Vanderlinden et al. | 55/357 |

* cited by examiner

*Primary Examiner* — Duane Smith
*Assistant Examiner* — Thomas McKenzie
(74) *Attorney, Agent, or Firm* — Sutherland Asbill & Brennan LLP (57) ABSTRACT

Certain embodiments of the invention may include systems, methods, and apparatus for mounting filters. According to an example embodiment of the invention, a method is provided for mounting one or more filters in a housing with a tubesheet, an intermediate support, and a directional mount. The method can include providing a filter with a first filter section, manipulating the first filter section with respect to the intermediate support, and manipulating the first filter second end with respect to the intermediate support, where the first filter second end maintains its relative position with respect to the intermediate support, and the intermediate support is operable to engage with a second end of the directional mount.

14 Claims, 8 Drawing Sheets

SYSTEMS, METHODS, AND APPARATUS FOR PROVIDING FILTRATION

FIELD OF THE INVENTION

This invention generally relates to filtration, and in particular, to air filtration.

BACKGROUND OF THE INVENTION

Industrial air filters are commonly used to remove dust and other particulates from incoming air streams. One of the most efficient and cost effective industrial filtration systems uses an array of filters within a filter housing Dust-laden gases enter the filter house and pass through the filters, which may be made of woven or non-woven natural, synthetic, or glass-fiber material. The filter media provides a surface on which dust particulates may collect, and with increased filtering, a dust cake is normally formed on the surfaces of the filters. Increased resistance to gas flow due to the build up of dust requires that the filter be cleaned periodically. These filters may be pleated.

In an up-flow filter configuration, the filters are typically fastened to a tubesheet plate and are suspended in a vertical orientation. Dirty gas flow normally enters the filter house and passes through the filter from the outside, and filtered dust collects on the outside of the filter. In some systems, reverse-flow pulses of air are sufficient to dislodge some of the dust particles from the filter material, but eventually, the filter material becomes too clogged and the filter must be replaced by service personnel. Although filtration efficiency may increase with the size and surface area of the filtration media, traditional filters are sized so that service personnel can easily install and replace the filters. A need remains for improved systems, methods, and apparatus for air filtration.

BRIEF SUMMARY OF THE INVENTION

Some or all of the above needs may be addressed by certain embodiments of the invention. Certain embodiments of the invention may include systems, methods, and apparatus for providing filtration. According to an example embodiment of the invention, a method is provided for mounting one or more filters in a housing with a tubesheet, an intermediate support, and a directional mount. The method can include providing a filter with a first filter section; manipulating the first filter section with respect to the intermediate support, the first filter section comprising a first filter first end operable for mounting adjacent to the tubesheet and a first filter second end operable for engaging the intermediate support, wherein the first filter first end maintains its relative position with respect to the tubesheet; and manipulating the first filter second end with respect to the intermediate support, wherein the first filter second end maintains its relative position with respect to the intermediate support, and the intermediate support is operable to engage with a second end of the directional mount.

According to another example embodiment, a system is provided. The system includes a housing; a tubesheet an intermediate support; a directional mount comprising two or more directional mount first ends operable for mounting to the tubesheet and a directional mount second end operable for mounting to the intermediate support. The system also includes at least one filter comprising: a first filter section comprising a first filter first end operable for mounting adjacent to the tubesheet and a first filter second end operable for engaging the intermediate support, wherein the first filter first end maintains its position with respect to the tubesheet, and the first filter second end maintains its relative position with respect to the intermediate support.

According to another example embodiment, an apparatus is provided. The apparatus includes an intermediate support operable for engaging with and supporting a first filter section; and a directional mount comprising two or more directional mount first ends operable for mounting to a tubesheet, wherein the directional mount comprises a second end operable for mounting to the intermediate support.

Other embodiments and aspects of the invention are described in detail herein and are considered a part of the claimed inventions. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the invention may enable mounting filters with multiple sections in existing filter housings. According to an example embodiment, multiple smaller filters may be installed and attached together to provide a single larger filter assembly. According to an example embodiment, an increase in filtration media area per tube sheet hole may reduce the media air velocity and the pressure drop across the filter. In an example embodiment, an increase in filtration media area per tube sheet hole may also reduce the energy needed to move air through the filter house and filters. According to an example embodiment, smaller filter sections may be utilized to assemble larger filters while avoiding weight issues that would normally be associated with lifting and installing a single large filter.

Various devices and parts may be utilized to enable mounting filters with multiple sections in filter housings, according to example embodiments of the invention, will now be described with reference to the accompanying figures.

Figure 1:
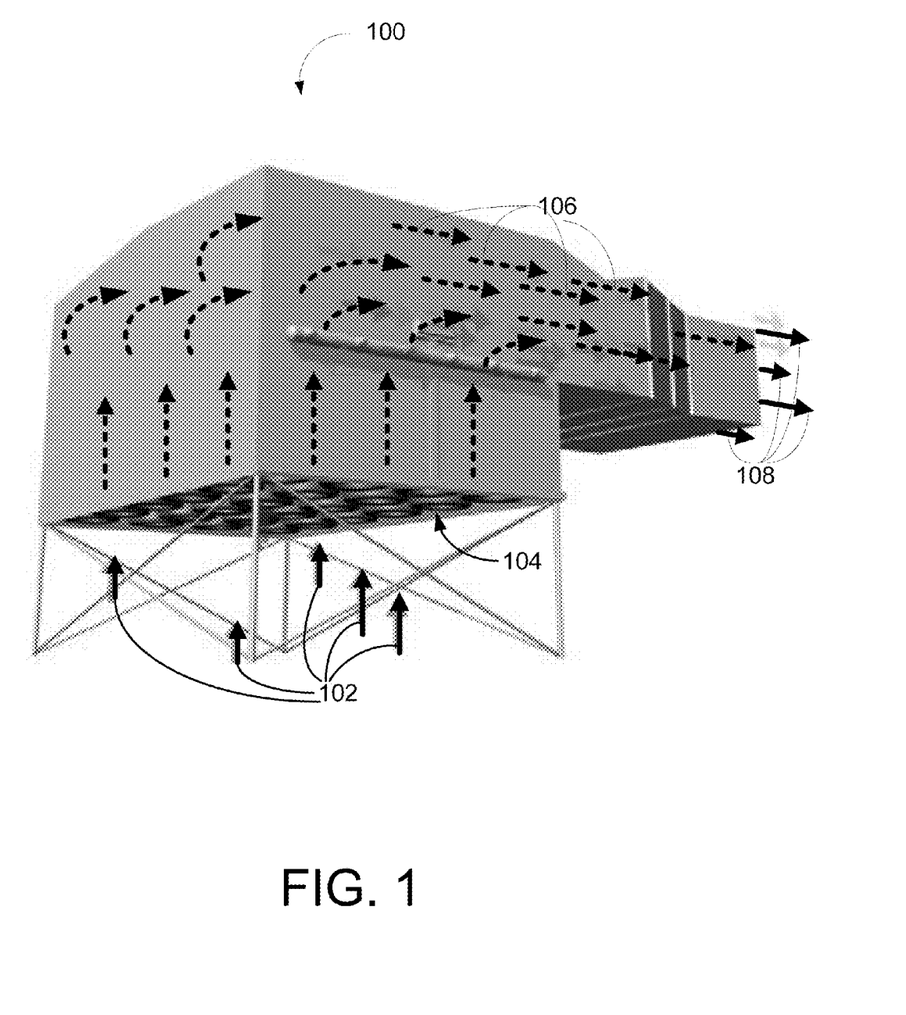
FIG. 1 is a block diagram of an illustrative filtration housing according to an example embodiment of the invention.

FIG. 1 illustrates an example vertical up-flow filter house 100. According to example embodiments of the invention, input air 102, which may contain dust or particulates, may enter the filter house 100 and the input air 102 may encounter filters 104 that may be hanging or suspended from a tubesheet within the filter house 100. In an example embodiment of the invention, the filters 104 may be attached to the tubesheet in multiple sections, whereby two or more of the filter sections may share the same tubesheet aperture. In an example embodiment, after passing through the filters 104, the filtered air 106 within the filter house 100 may flow through an output port and the clean output air 108 may then be directed to other areas or machinery for use.

According to an example embodiment of the invention, installing the filters 104 in a vertical orientation within the filter house 100 may provide certain beneficial effects. For example, the filters may be cleaned by reverse-flow pulses of air and the dislodged dust may accumulate in a region below the filters 104 for easy removal.

Figure 2:
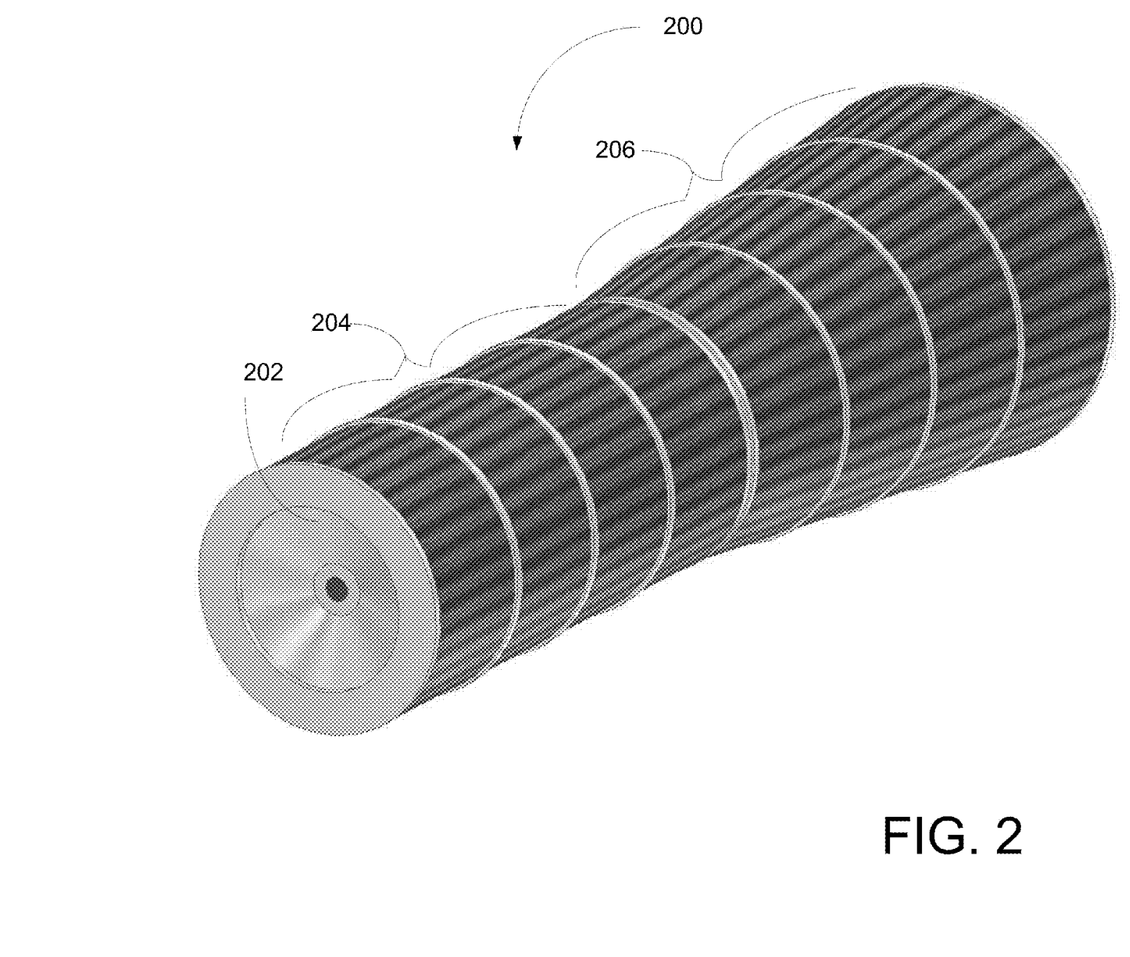
FIG. 2 is a block diagram of an illustrative filter assembly according to an example embodiment of the invention.

FIG. 2 depicts an example embodiment of a filter 200 having multiple sections. In an example embodiment, the filter 200 may include an end cap 202, a first section 206 and a second section 204. For example, in an example embodiment, the first section 206 may be made with a conical shape, and the second section 204 may be made with a cylindrical shape. According to other example embodiments, the first section 206 and the second section 204 may be formed into any convenient shape. According to an example embodiment, the first section 206 and the second section 204 may be joined using other techniques without departing from the scope of the invention. According to other example embodiments, two or more filter sections may be utilized to assemble a single filter assembly.

Figure 3:
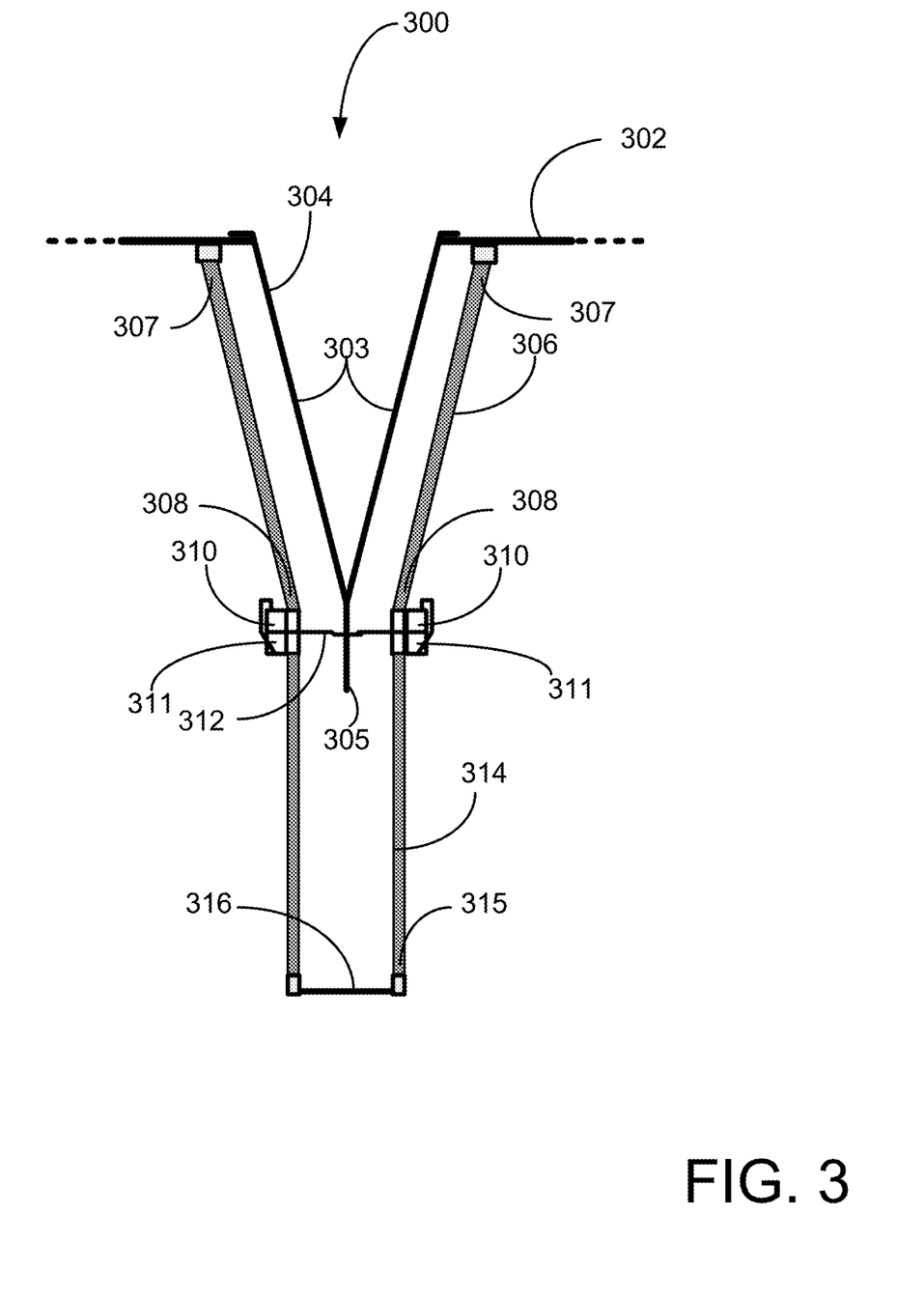
FIG. 3 is a block diagram of an illustrative filter and attachment assembly according to an example embodiment of the invention.

FIG. 3 depicts a side view of a mounted filter assembly 300 with associated hardware, according to an example embodiment of the invention. In an example embodiment, the filter assembly 300 may be attached to a tubesheet 302 so that the air passes through the filter material of the multi-section filter assembly before traveling through the tubesheet aperture 301. According to an example embodiment of the invention, a directional mount 303 may provide support for hanging the filter assembly 300 adjacent to the tubesheet 302. In an example embodiment, the directional mount 303 may have two or more first ends 304. For example, a tripod configuration for the directional mount 303 first ends 304 may be sufficient to support the hanging filter assembly. In an example embodiment, the first ends 304 may include a flange or bent region that may engage with a portion of the top part of the tubesheet.

According to an example embodiment, the directional mount 303 may also include a second end 305 that may be utilized for attaching to an intermediate support 312, as will be described below. In an example embodiment, the first filter section 306 (corresponding to 206 of FIG. 2) may be supported, and held adjacent to the tubesheet 302 by the combination of the directional mount 303 and the intermediate support 312. For example, the intermediate support 312 may engage with the second end of the directional mount 305, and the first filter section 306 may be supported and held against the tubesheet 302 by the intermediate support 312. In an example embodiment, the first filter section 306 may include a first filter first end 307 that may include a gasket or similar pliable surface operable for sealing the first filter first end 307 against the tubesheet 302. According to an example embodiment, the first filter second end 308 may include, or be operable for attaching a first filter section clamp 310.

According to an example embodiment, the filter assembly 300 may include a second filter section 314 (corresponding, for example, to 204 of FIG. 2). In an example embodiment, the second filter section 314 may be operable for attaching to the first filter section 306. In an example embodiment, the second filter section 314 may include a second filter section clamp 311 that may connect with the first filter section clamp 310 for securing the second filter section 314 to the first filter section 306. In an example embodiment, the directional mount 303 and the intermediate support 315 may provide the hanging support for both the first filter section 306, the second filter section 314, and the clamps 310, 311.

According to an example embodiment of the invention, the term "clamp" may include various fastening devices, including but not limited to simple twist lock type fastening devices. In example embodiments, the clamp may include hooks, eyelets, latches, and other devices suitable for securing the second filter section 314 to the first filter section 306.

According to an example embodiment of the invention, the second filter section 315 may include an end cap 316 (corresponding, for example, to 202 of FIG. 2) adjacent to the second end 315 of the second filter section 314.

Figure 4:
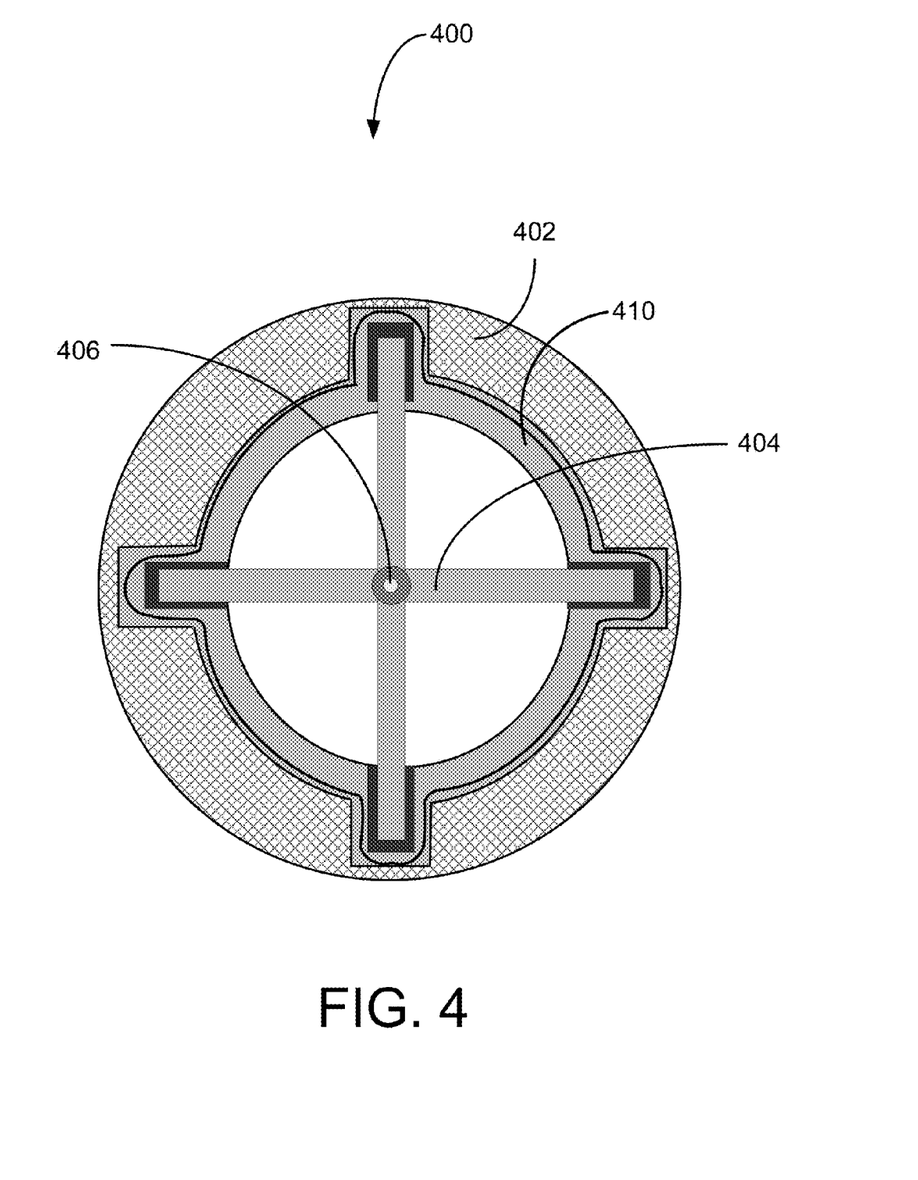
FIG. 4 is a block diagram of an illustrative intermediate support according to an example embodiment of the invention.

FIG. 4 depicts an end view of an example embodiment of a filter mounting midsection 400 as if one were looking up from the first filter section 402 towards the tubesheet. According to an example embodiment, the second end of the first filter section (as in 308 of FIG. 3) may include recessed areas for the directional mount 404 to engage with once the filter is in place. According to an example embodiment, the intermediate support 404 may include an aperture 406 for accepting the second end of the directional mount (as in 305 of FIG. 3). In an example embodiment, a gasket 410 may be utilized provide a continuous seal in the interface joining the first filter section (for example 206 of FIG. 2) and a second filter section (for example, 204 of FIG. 2).

Figure 5:
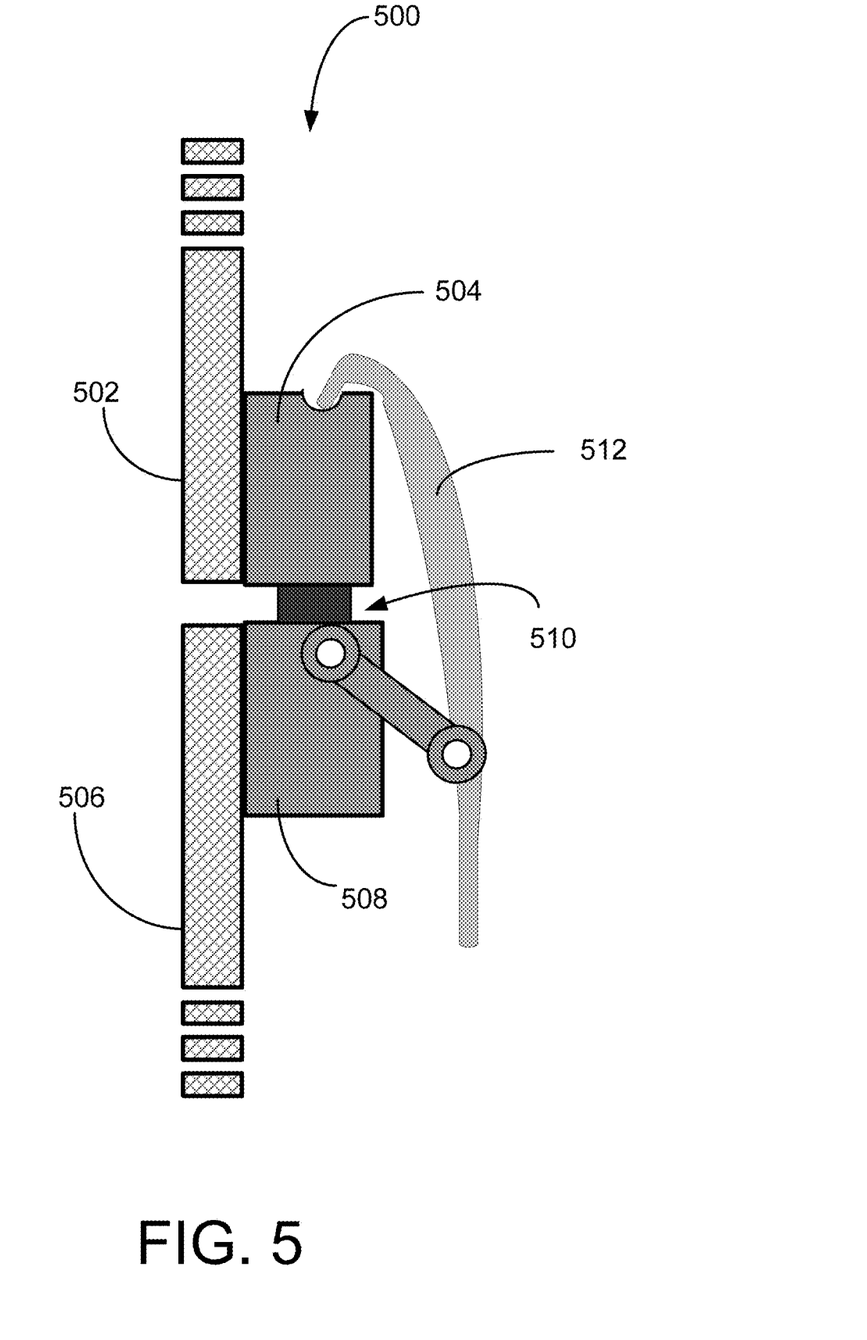
FIG. 5 is a block diagram of an illustrative clamp assembly according to an example embodiment of the invention.

FIG. 5 depicts an example clamp assembly 500 operable for attaching the second filter section 506 to the first filter section 502, according to an example embodiment of the invention. Parts of the clamp assembly 500 may correspond to the first filter section clamp 310 and the second filter section clamp 311 of FIG. 3, according to an example embodiment. In an example embodiment, the clamp assembly 500 may include an upper clamp section 504 and a lower clamp section 508. According to an example embodiment, the clamp assembly 500 may include a compressible gasket 510 between the upper clamp section 504 and the lower clamp section 508. In an example embodiment, the gasket 510 (corresponding to 410 of FIG. 4) may provide an air-tight (or near-air tight) seal between the filter sections. In an example embodiment, the clamp assembly 500 may include a clamp hook 512 may be operable for securing the lower clamp section 508 to the upper clamp section 504.

Figure 6:
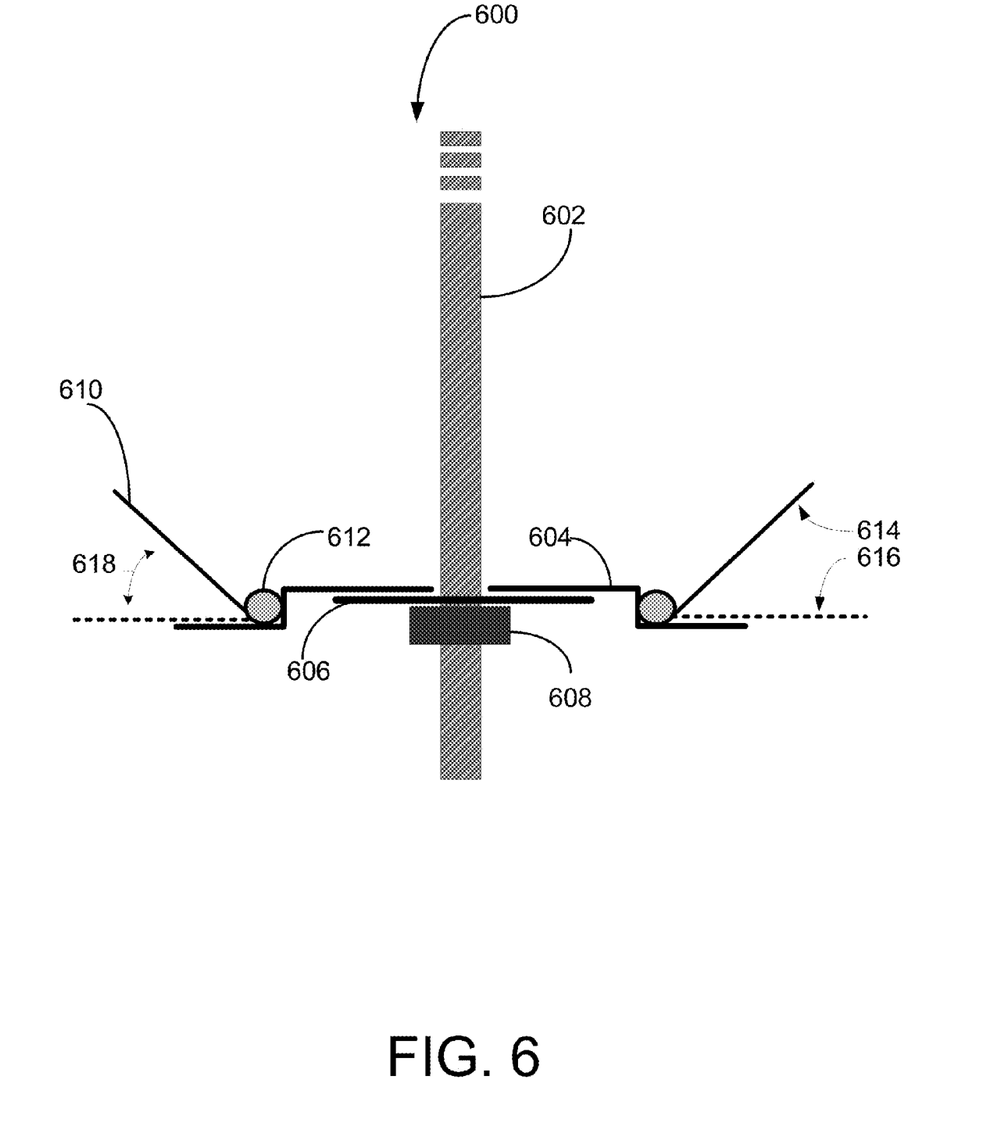
FIG. 6 is a block diagram of an illustrative directional mount and intermediate support according to an example embodiment of the invention.

FIG. 6 depicts an intermediate mount assembly 600, according to an example embodiment of the invention. In an example embodiment, the intermediate mount assembly 600 may include a directional mount end 602 (as in 305 of FIG. 3) that is operable to engage with an intermediate support 604. According to an example embodiment, the intermediate support 604 may include one or more hinged brackets 610 that may be secured with hinges 612 to a portion of the intermediate support 604 frame. According to an example embodiment, the intermediate support 604 may be secured to the directional mount end 602 with a nut 608 and an optional washer 606.

According to an example embodiment of the invention, the intermediate support assembly 604, 610, 612 may be operable for allowing a filter section (as in 306 of FIG. 3) to slide over and above the hinged brackets 610, causing an upward rotation 618 of the hinged brackets to an installation position 614, then after the filter section has cleared the hinged brackets 610, the hinged brackets 610 may rotate back to an operational position 616 and support the filter section, at which time the nut 608 may be tightened to secure the filter section to the tubesheet. According to example embodiments of the invention, the intermediate end mount 600 may allow service personnel to utilize both hands in installing the filter section, and the hinged brackets 610 may automatically give way to allow the installation of the filter, then automatically return to a resting position (616) for supporting the filter.

Figure 7:
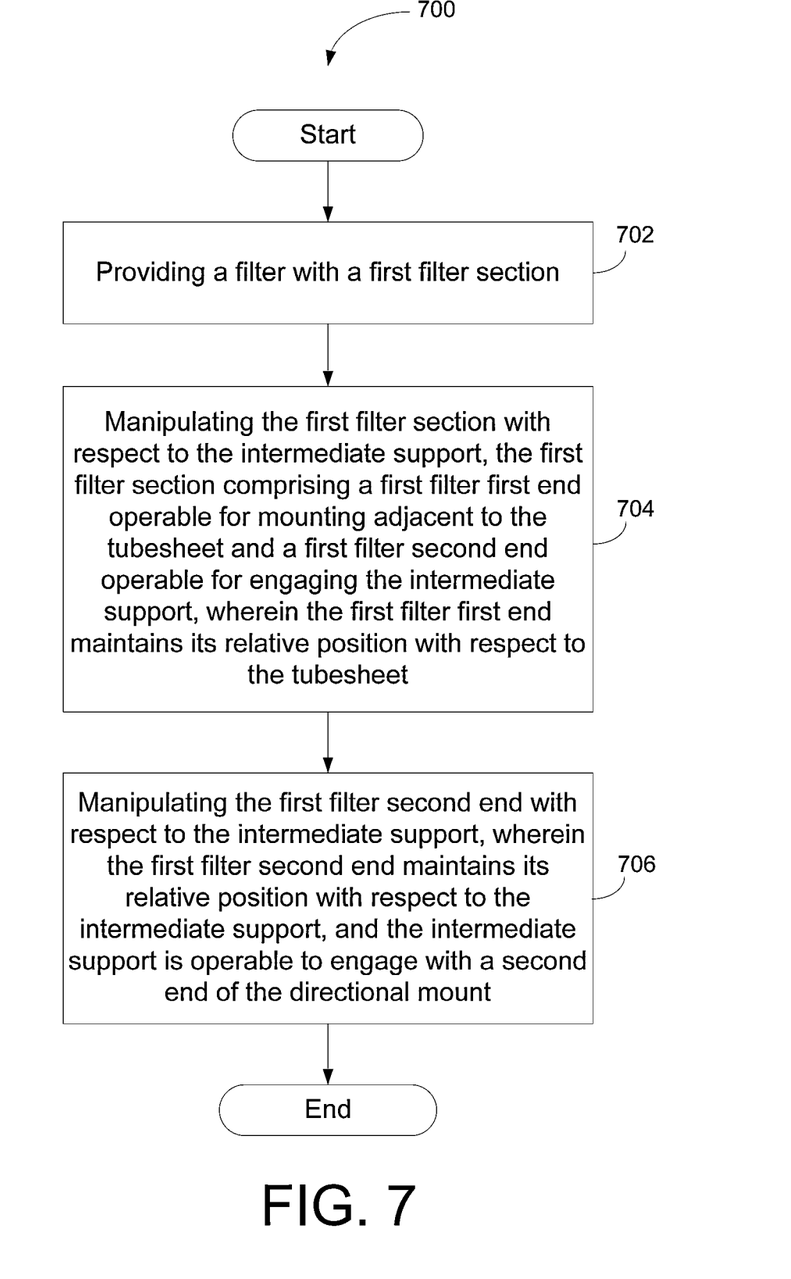
FIG. 7 is a flow diagram of an example method according to an example embodiment of the invention.

An example method 700 for mounting one or more filters in a housing with a tubesheet, an intermediate support, and a directional mount will now be described with reference to the flowchart of FIG. 7. The method 700 starts in block 702, and according to an example embodiment of the invention, includes providing a filter with a first filter section. In block 704, the method 700 includes manipulating the first filter section with respect to the intermediate support, the first filter section comprising a first filter first end operable for mounting adjacent to the tubesheet and a first filter second end operable for engaging the intermediate support, wherein the first filter first end maintains its relative position with respect to the tubesheet. In block 706, the method includes manipulating the first filter second end with respect to the intermediate support, wherein the first filter second end maintains its relative position with respect to the intermediate support, and the intermediate support is operable to engage with a second end of the directional mount. The method 700 ends after block 706.

According to an example embodiment, the intermediate support (312) may include one or more horizontal hinged support brackets (610) operable to rotate towards the tubesheet (302) to provide clearance for the first filter section (306) during installation and further operable to return to an initial position for engaging with the first filter second end (308) and for supporting first filter section (306). According to an example embodiment, the method can include providing one or more upper clamp sections (504), wherein the one or more upper clamp sections (504) are secured to the first filter second end (308); and providing a second filter section (314) comprising a second filter first end (313) having one or more lower clamp sections (508) operable for attaching to the one or more upper clamp sections (504).

According to an example embodiment, the method can include installing and securing the second filter section (314) to the first filter section (306) by attaching the one or more lower clamp sections (508) to the one or more upper clamp sections (504), wherein securing the second filter section (314) to the first filter section (306) comprises engaging at least a portion of a clamp hook (512) into the upper clamp section (504), wherein the clamp hook (512) is linked to the lower clamp section (508). According to an example embodiment, the method can include engaging one first end (304) of the directional mount (303) with the tubesheet (302) and securing the second end (305) of the directional mount (303) to the intermediate support (312).

According to an example embodiment, the method can include installing and securing the first filter section (306) to the tubesheet (302) by sealing the interface between the tubesheet (302) and the first filter first end (307).

Example embodiments of the invention may include a system or apparatus that may include one or more of the following: a housing (100); a tubesheet (302); an intermediate support (312); a directional mount (303) comprising two or more directional mount first ends (304) operable for mounting to the tubesheet (302) and a directional mount second end (305) operable for mounting to the intermediate support (312); at least one filter (104) including a first filter section (306) comprising a first filter first end (307) operable for mounting adjacent to the tubesheet (302) and a first filter second end (308) operable for engaging the intermediate support (312), wherein the first filter first end (307) maintains its position with respect to the tubesheet (302), and the first filter second end (308) maintains its relative position with respect to the intermediate support (312).

According to an example embodiment, the system or apparatus may also include wherein the intermediate support (312) further comprises one or more horizontal hinged support brackets (610) operable to rotate towards the tubesheet (302) to provide clearance for the first filter section (306) during installation and further operable to return to an initial position for engaging with the first filter second end (308) and for supporting first filter section (306).

According to an example embodiment, the system or apparatus may also include one or more upper clamp sections (504) secured to the first filter second end (308); and a second filter section (314) comprising a second filter first end (313) having one or more lower clamp sections (508) operable for attaching to the one or more upper clamp sections (504), wherein the second filter section (314) is secured to the first filter section (306) by attaching the one or more lower clamp sections (508) to the one or more upper clamp sections (504).

According to an example embodiment, the system or apparatus may also include a clamp hook (512) linked to the lower clamp section (508) and wherein the second filter section (314) is secured to the first filter section (306) by engaging at least a portion of a clamp hook (512) into the upper clamp section (504). According to an example embodiment, the system or apparatus may also include at least one first end (304) of the directional mount (303) engages with the tubesheet (302) and wherein the second end (305) of the directional mount (303) is secured to the intermediate support (312) with at least a threaded nut (608).

According to an example embodiment, the system or apparatus may also include a first filter section (306) that includes a seal operable for sealing the interface between the tubesheet (302) and the first filter first end (307).

Figure 8:
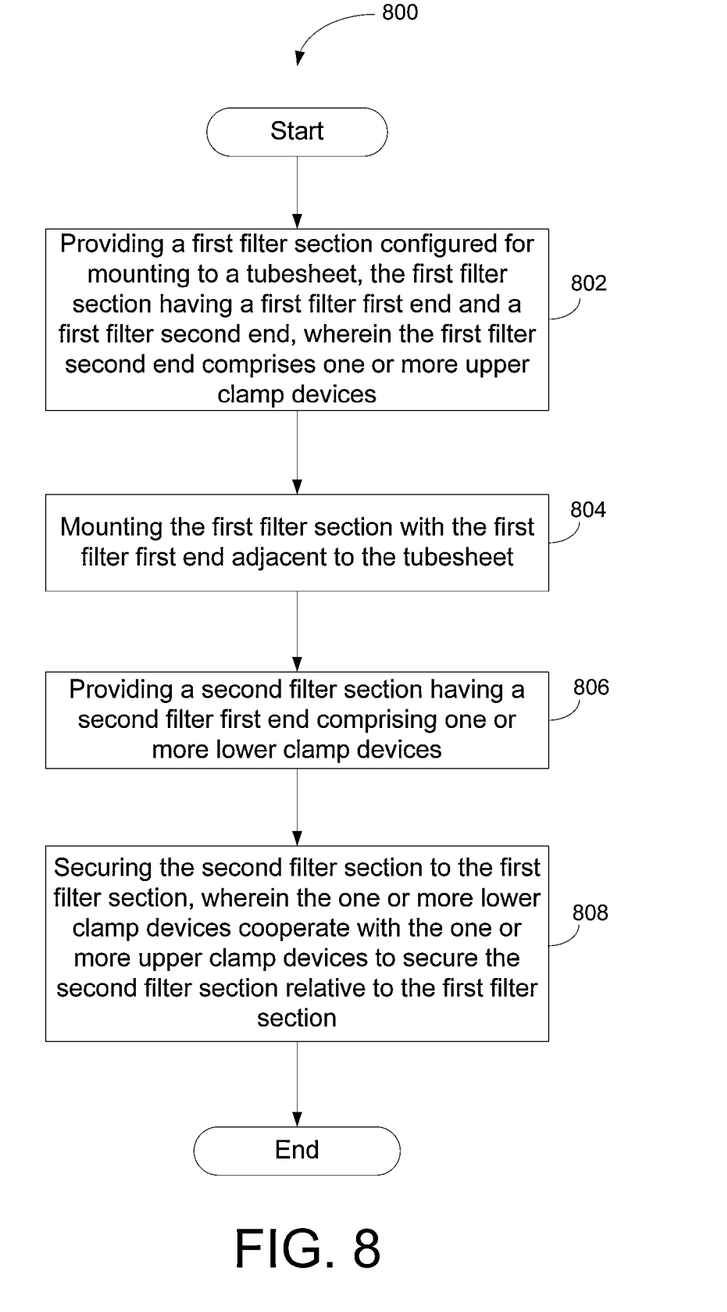
FIG. 8 is a flow diagram of another example method according to an example embodiment of the invention.

Another example method 800 for mounting a filter comprising two or more filter sections in a housing will now be described with reference to the flowchart of FIG. 8. The method 800 starts in block 802, and according to an example embodiment of the invention, includes providing a first filter section configured for mounting to a tubesheet, the first filter section having a first filter first end and a first filter second end, wherein the first filter second end comprises one or more upper clamp devices. In block 804, the method 800 includes mounting the first filter section with the first filter first end adjacent to the tubesheet. In block 806, the method 800 includes providing a second filter section having a second filter first end comprising one or more lower clamp devices. In block 808, the method 800 includes securing the second filter section to the first filter section, wherein the one or more lower clamp devices cooperate with the one or more upper clamp devices to secure the second filter section relative to the first filter section. The method 800 ends after block 808.

According to an example embodiment, the method can include securing the second filter section (314) to the first filter section (306) by engaging at least a portion of one or more clamp hooks (512) to the one or more upper clamp devices (504), wherein the one or more clamp hooks (512) are linked to the one or more lower clamp devices (508). According to an example embodiment, the method can include securing the second filter section (314) to the first filter section (306) by engaging at least a portion of one or more clamp hooks (512) to the one or more lower clamp devices (508), wherein the one or more clamp hooks (512) are linked to the one or more upper clamp devices (504). According to an example embodiment, the method can include securing the second filter section (314) to the first filter section (306) by sealing at least a portion of and interface between the second filter section (314) and the first filter section (306).

According to an example embodiment, the method can include manipulating the first filter section (306) with respect to an intermediate support (312), wherein the first filter second end (308) is operable for engaging the intermediate support (312), and wherein the first filter first end (307) maintains its relative position with respect to the tubesheet (302). According to an example embodiment, the method can include manipulating the first filter second end (308) with respect to the intermediate support (312), wherein the first filter second end (308) maintains its relative position with respect to the intermediate support (312), and the intermediate support (312) is operable to engage with a second end (305) of a directional mount (303). According to an example embodiment, the intermediate support (312) may include one or more horizontal hinged support brackets (610) operable to rotate towards the tubesheet (302) to provide clearance for the first filter section (306) during installation and further operable to return to an initial position for engaging with the first filter second end (308) and for supporting first filter section (306). According to an example embodiment, the method can include engaging at least one first end (304) of the directional mount (303) with the tubesheet (302) and wherein the second end (305) of the directional mount (303) is secured to the intermediate support (312).

Example embodiments of the invention may include a system or apparatus that may include one or more of the following: a housing (100); a tubesheet (302); an intermediate support (312); a first filter section (306) comprising a first filter first end (307) operable for mounting adjacent to the tubesheet (302) and a first filter second end (308) operable for engaging the intermediate support (312), wherein the first filter first end (307) maintains its position with respect to the tubesheet (302), and the first filter second end (308) maintains its relative position with respect to the intermediate support (312); one or more upper clamp devices (310) secured to the first filter second end (308); and a second filter section (314) comprising a second filter first end (313) having one or more lower clamp devices (508) operable to secure the second filter section (314) relative to the first filter section (306).

According to an example embodiment, the system or apparatus may also include a directional mount (303) having two or more directional mount first ends (304) operable for mounting to the tubesheet (302) and a directional mount second end (305) operable for mounting to the intermediate support (312). In an example embodiment, the intermediate support (312) may include one or more horizontal hinged support brackets (610) operable to rotate towards the tubesheet (302) to provide clearance for the first filter section (306) during installation and further operable to return to an initial position for engaging with the first filter second end (308) and for supporting first filter section (306).

According to an example embodiment, the system or apparatus may also include one or more clamp hooks (512) linked to the one or more lower clamp devices (508) and wherein the second filter section (314) is secured to the first filter section (306) by engaging at least a portion of the one or more clamp hook (512) into the one or more upper clamp devices (504). According to an example embodiment, the system may also include one or more clamp hooks (512) linked to the one or more upper clamp devices (504) and wherein the second filter section (314) is secured to the first filter section (306) by engaging at least a portion of the one or more clamp hook (512) into the one or more lower clamp devices (508), wherein at least one first end (304) of the directional mount (303) engages with the tubesheet (302) and wherein the second end (305) of the directional mount (303) is secured to the intermediate support (312) with at least a threaded nut (608). According to an example embodiment, the system may also include further comprising a seal operable for sealing at least a portion of the interface between the first filter second end (308) and the second filter first end (313).

According to example embodiments, certain technical effects can be provided, such as creating certain systems, methods, and apparatus that provide multi-section filters to be easily installed and assembled. Example embodiments of the invention can provide the further technical effects of providing systems, methods, and apparatus for mounting filters.

In example embodiments of the invention, the housing system 100 and the assembly 300 may include any number of hardware components operable facilitate any of the functions As desired, embodiments of the invention may include more or less of the components illustrated in FIGS. 1 through 6.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for mounting one or more filters in a housing with a tubesheet, an intermediate support, and a directional mount; the method comprising:

providing a filter with a first filter section; and manipulating the first filter section with respect to the intermediate support, the first filter section comprising a first filter first end operable for mounting directly to the tubesheet and a first filter second end operable for engaging the intermediate support, wherein the first filter first end maintains its relative position with respect to the tubesheet;

wherein the filter comprises a second filter section comprising a second filter first end operable for engaging the intermediate support; and manipulating the first filter second end with respect to the intermediate support, wherein the first filter second end maintains its relative position with respect to the intermediate support, and the intermediate support is operable to engage with a second end of the directional mount.

2. The method of claim 1, wherein the intermediate support further comprises one or more horizontal hinged support brackets operable to rotate towards the tubesheet to provide clearance for the first filter section during installation and further operable to return to an initial position for engaging with the first filter second end and for supporting first filter section.

3. The method of claim 1, further comprising:
providing one or more upper clamp sections, wherein the one or more upper clamp sections are secured to the first filter second end, and
wherein the second filter section comprises the second filter first end having one or more lower clamp sections operable for attaching to the one or more upper clamp sections.

4. The method of claim 3, further comprising installing and securing the second filter section to the first filter section by attaching the one or more lower clamp sections to the one or more upper clamp sections.

5. The method of claim 4, wherein securing the second filter section to the first filter section comprises engaging at least a portion of a clamp hook into the upper clamp section, wherein the clamp hook is linked to the lower clamp section.

6. The method of claim 1, wherein at least one first end of the directional mount engages with the tubesheet and wherein the second end of the directional mount is secured to the intermediate support.

7. The method of claim 1, wherein installing and securing the first filter section to the tubesheet further comprises sealing the interface between the tubesheet and the first filter first end.

8. A system comprising:
a housing;
a tubesheet
an intermediate support;
a directional mount comprising two or more directional mount first ends operable for mounting to the tubesheet and a directional mount second end operable for mounting to the intermediate support;
at least one filter comprising:
a first filter section comprising a first filter first end operable for mounting adjacent to the tubesheet and a first filter second end operable for engaging the intermediate support, wherein the first filter first end maintains its position with respect to the tubesheet, and the first filter second end maintains its relative position with respect to the intermediate support, and wherein the filter comprises a second filter section comprising a second filter first end operable for engaging the intermediate support.

9. The system of claim 8, wherein the intermediate support further comprises one or more horizontal hinged support brackets operable to rotate towards the tubesheet to provide clearance for the first filter section during installation and further operable to return to an initial position for engaging with the first filter second end and for supporting first filter section.

10. The system of claim 8 further comprising:
one or more upper clamp sections secured to the first filter second end; and
the second filter section comprising the second filter first end having one or more lower clamp sections operable for attaching to the one or more upper clamp sections.

11. The system of claim 10, wherein the second filter section is secured to the first filter section by attaching the one or more lower clamp sections to the one or more upper clamp sections.

12. The system of claim 11, further comprising a clamp hook linked to the lower clamp section and wherein the second filter section is secured to the first filter section by engaging at least a portion of a clamp hook into the upper clamp section.

13. The system of claim 8, wherein at least one first end of the directional mount engages with the tubesheet and wherein the second end of the directional mount is secured to the intermediate support with at least a threaded nut.

14. The system of claim 8, wherein the first filter section further comprises a seal operable for sealing the interface between the tubesheet and the first filter first end.

* * * * *

UNITED STATES PATENT AND TRADEMARK OFFICE
CERTIFICATE OF CORRECTION

| | |
|---|---|
| PATENT NO. | : 8,425,671 B2 |
| APPLICATION NO. | : 13/180783 |
| DATED | : April 23, 2013 |
| INVENTOR(S) | : Mann et al. |

It is certified that error appears in the above-identified patent and that said Letters Patent is hereby corrected as shown below:

In the Claims:

In Column 9, Line 37, in Claim 8, delete "tubesheet" and insert -- tubesheet; --, therefor.

Signed and Sealed this
Twenty-fifth Day of June, 2013

Teresa Stanek Rea
*Acting Director of the United States Patent and Trademark Office*